UNITED STATES PATENT OFFICE.

ALFRED F. PARSHALL, OF KANSAS CITY, MISSOURI.

ARTIFICIAL OR PLASTIC SLATE FOR BLACKBOARDS.

SPECIFICATION forming part of Letters Patent No. 323,722, dated August 4, 1885.

Application filed June 26, 1885. (No specimens.)

*To all whom it may concern:*

Be it known that I, ALFRED F. PARSHALL, of Kansas City, Jackson county, Missouri, have invented a new and useful compound, which I designate as Artificial or Plastic Slate for Blackboards, and of which the following is a full, clear, and exact description.

I propose to employ the improved compound principally in the manufacture of blackboards for schools, school-slates, &c.

The compound and the process of making it and using it may be fully described in the following language:

The compound is composed of the following substances, in about the proportions stated; but the process of compounding them may be varied without departing from the invention—as, for instance, in shading the compound with different coloring substances. For the body of the compound I employ that which I am about to describe, as I have found that in practice it produces very satisfactory results. I first take about thirty (30) parts of finely-pulverized pumice-stone, thirty (30) parts chrome-green, or a like proportion of any desired mineral coloring-matter that will harmonize with the other ingredients, and fifteen (15) parts magnesia. The above-mentioned substances I mix together thoroughly with boiled linseed-oil to the consistency of a thin paste, and grind them thus mixed in a suitable mill, after which twenty-five (25) parts Portland cement are thoroughly mixed with the product, and it is then ready to be used.

I prefer to apply the compound with a common hand-trowel; but any other appropriate instrument can be used for this purpose. As the compound dries it becomes hardened sufficiently for use, and it may then be considered as complete.

I employ magnesia as an ingredient of my compound, because I have found that it produces a very desirable elasticity of surface.

In order to vary the results to be attained in certain cases, I may add to the compound above described a number of other ingredients, which shall be governed by my judgment in each case. For instance, to give a particular result, marble-dust or emery will be used in addition to the pulverized slate.

The same remarks will apply to the coloring-matters used in the compound, for I have found that the action of the matter known as "drop-black" upon the compound is different from the action of ivory-black. So, also, may it be said of ultramarine-blue, mineral brown, and chrome-yellow. In certain instances I may substitute any one or a number of these for the chrome-green before mentioned, as circumstances may point out.

In connection with the boiled linseed oil, and in order to hasten the drying process, in some instances it will be desirable to add a certain quantity of spirits of turpentine. Again, in some particular cases, a portion of the previously-specified Portland cement may be displaced by a like portion of plaster-of-paris, and a better result will be had than if only the cement had been used; and in connection with magnesia I may sometimes add a quantity of talc or talcose earth, as desired.

I claim—

The herein-described compound, consisting of pulverized pumice-stone, chrome-green or other mineral coloring-matter, boiled linseed-oil, and Portland cement, in substantially the proportions specified.

In testimony whereof I affix my signature in presence of two witnesses.

ALFRED F. PARSHALL.

Witnesses:
H. C. ROBERTSON,
F. A. BENSON.